(12) United States Patent
Sohn et al.

(10) Patent No.: US 11,694,829 B2
(45) Date of Patent: Jul. 4, 2023

(54) MAGNETIC SHEET AND WIRELESS POWER MODULE COMPRISING SAME

(71) Applicant: LG INNOTEK CO., LTD., Seoul (KR)

(72) Inventors: In Seong Sohn, Seoul (KR); Seok Bae, Seoul (KR); Dong Hyeok Choi, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 408 days.

(21) Appl. No.: 17/056,555

(22) PCT Filed: May 14, 2019

(86) PCT No.: PCT/KR2019/005761
§ 371 (c)(1),
(2) Date: Nov. 18, 2020

(87) PCT Pub. No.: WO2019/231142
PCT Pub. Date: Dec. 5, 2019

(65) Prior Publication Data
US 2021/0249166 A1 Aug. 12, 2021

(30) Foreign Application Priority Data
May 29, 2018 (KR) .................. 10-2018-0061265

(51) Int. Cl.
*H01F 1/147* (2006.01)
*H02J 50/10* (2016.01)

(52) U.S. Cl.
CPC .......... *H01F 1/14783* (2013.01); *H02J 50/10* (2016.02)

(58) Field of Classification Search
CPC ............................. H01F 1/14783; H02J 50/10
(Continued)

(56) References Cited

U.S. PATENT DOCUMENTS 8,729,736 B2 * 5/2014 Urano .................. H02J 50/12
307/104
2011/0080054 A1 * 4/2011 Urano .................. H02J 50/12
307/104
(Continued)

FOREIGN PATENT DOCUMENTS

CN 104900383 9/2015
KR 10-2015-0084213 7/2015
(Continued)

OTHER PUBLICATIONS

Chinese Office Action dated Oct. 10, 2022 issued in Application No. 201980035787.6.
(Continued)

*Primary Examiner* — Alfonso Perez Borroto
(74) *Attorney, Agent, or Firm* — Ked & Associates, LLP

(57) ABSTRACT

A magnetic sheet according to an embodiment of the present invention comprises: a first soft magnetic layer including a first surface and a second surface opposite to the first surface; a first resin layer disposed on the first surface of the first soft magnetic layer and having a first viscosity; a second soft magnetic layer disposed on the first resin layer; and a second resin layer disposed between the first soft magnetic layer and the first resin layer and having a second viscosity different from the first viscosity, wherein the second resin layer comprises a plurality of magnetic particles, the first soft magnetic layer includes a plurality of crack areas propagated from the first surface toward the second surface, and a part of the second resin layer is disposed in the plurality of crack areas.

20 Claims, 12 Drawing Sheets

(58) Field of Classification Search
USPC .......................................................... 307/104
See application file for complete search history.

(56) References Cited

U.S. PATENT DOCUMENTS

2013/0099591 A1\* 4/2013 Yeo ..................... H02J 7/00712
    307/104
2018/0286546 A1\* 10/2018 Lee ......................... B32B 9/005

FOREIGN PATENT DOCUMENTS

| KR | 10-2016-0037650 | 4/2016 |
| KR | 10-2017-0040776 | 4/2017 |
| KR | 10-2017-0054914 | 5/2017 |
| KR | 10-2017-0059908 | 5/2017 |
| KR | 10-2018-0006868 | 1/2018 |

OTHER PUBLICATIONS

International Search Report dated Aug. 26, 2019 issued in Application No. PCT/KR2019/005761.

\* cited by examiner

[FIG. 1]
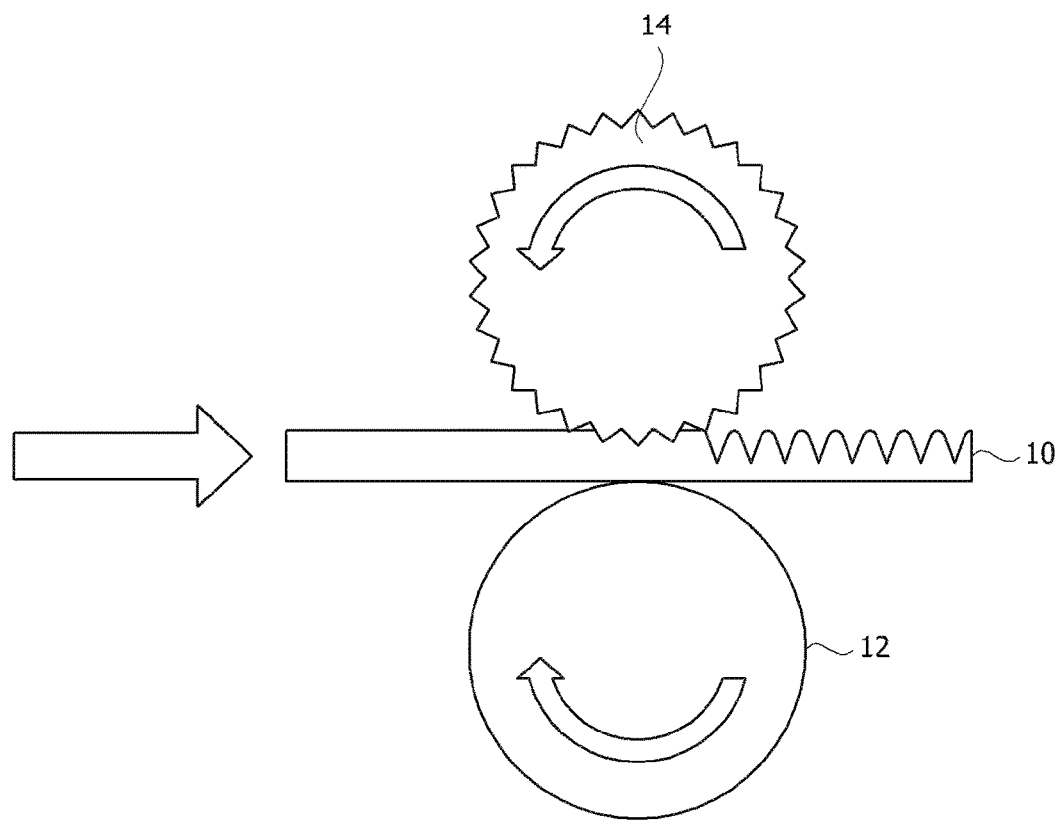
[FIG. 2]
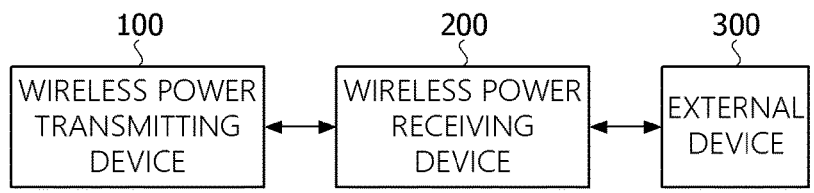

[FIG. 3]
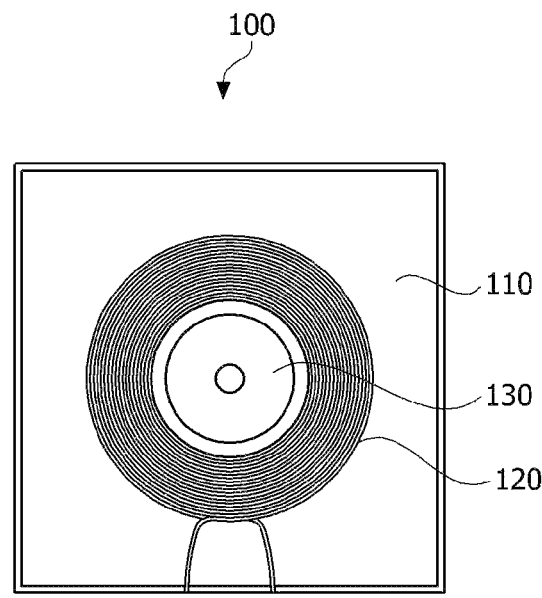
[FIG. 4]
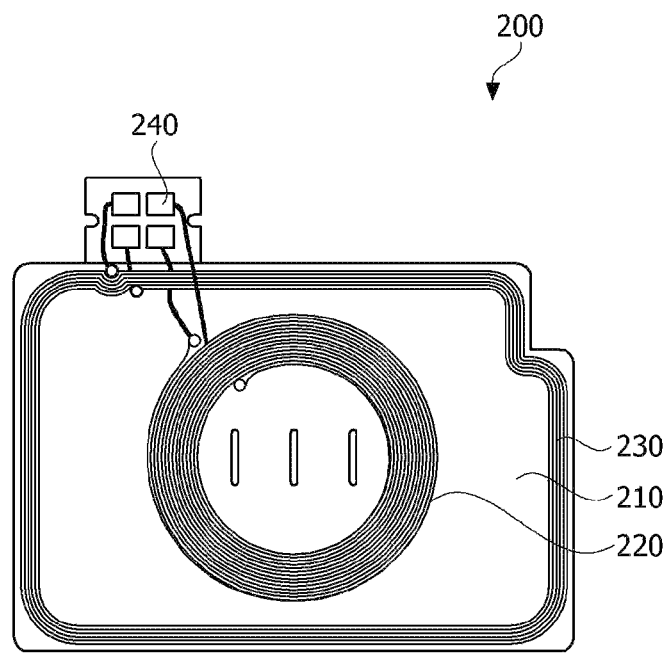

[FIG. 5]
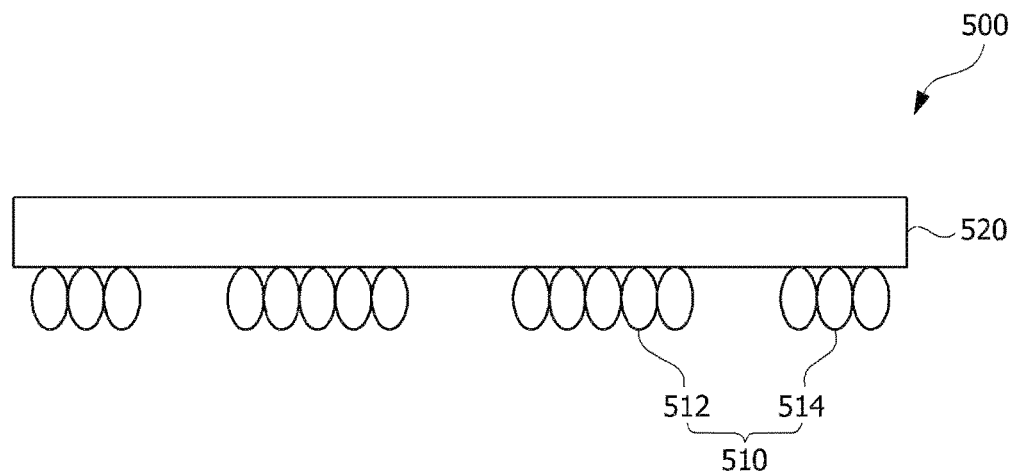
[FIG. 6]
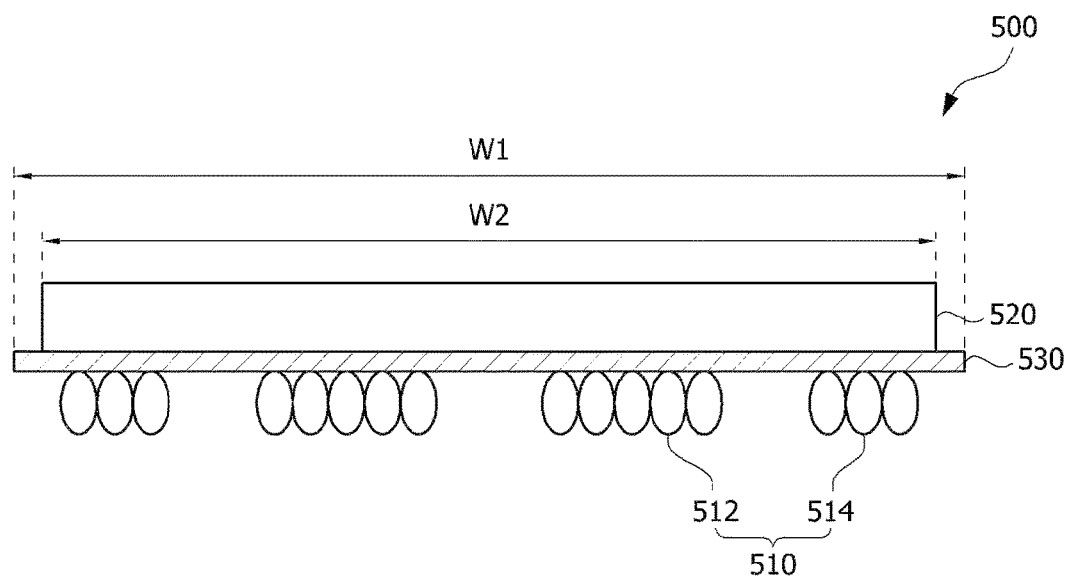

[FIG. 7]
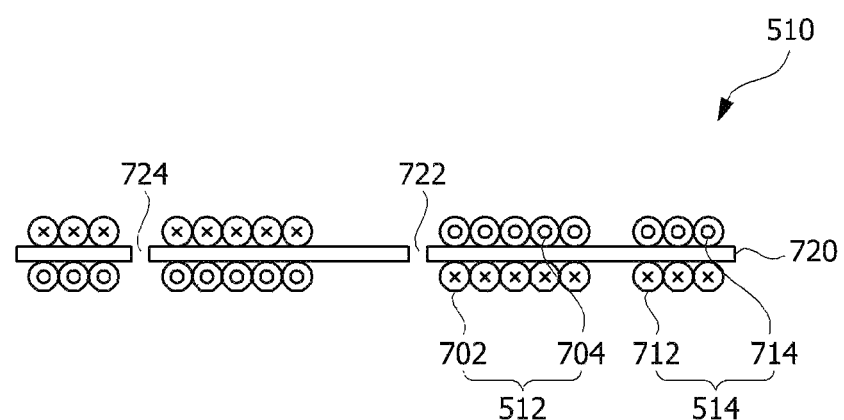

[FIG. 8]
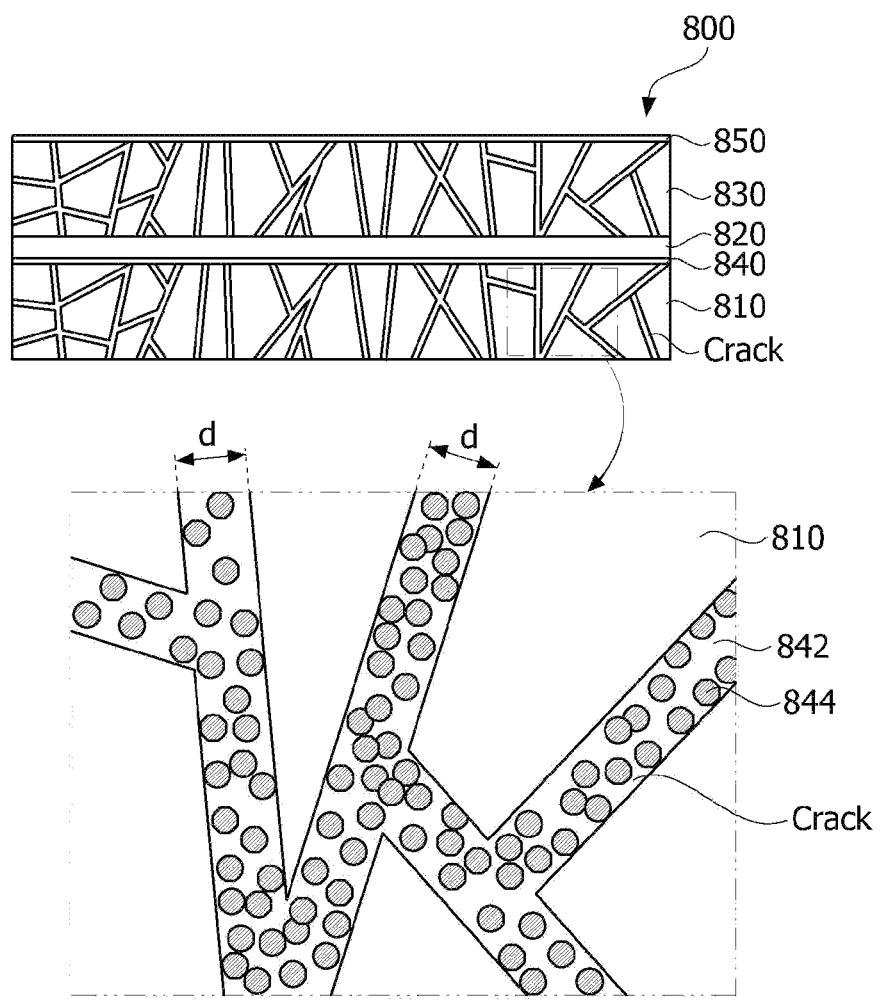

[FIG. 9]
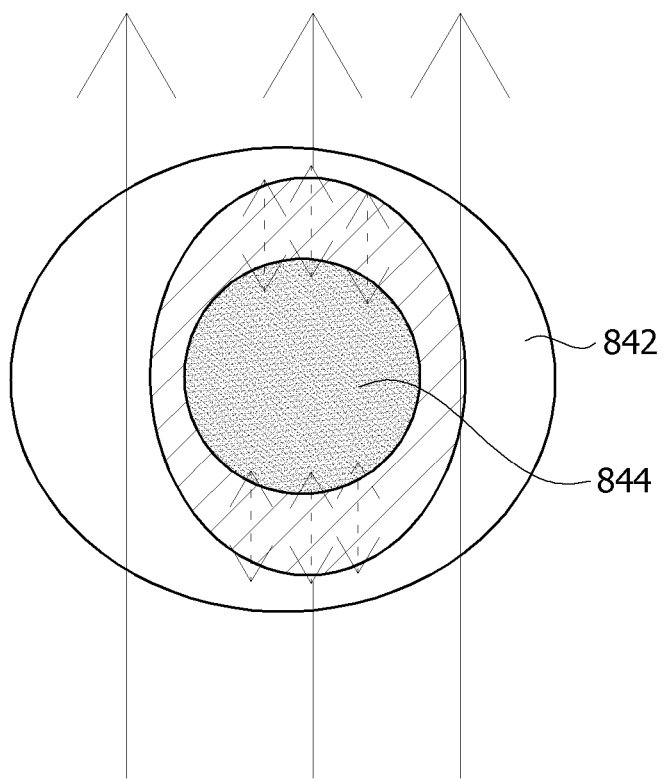
→ MAGNETIC FIELD
<- - -> FLOW OF MAGNETIC PARTICLES

[FIG. 10]
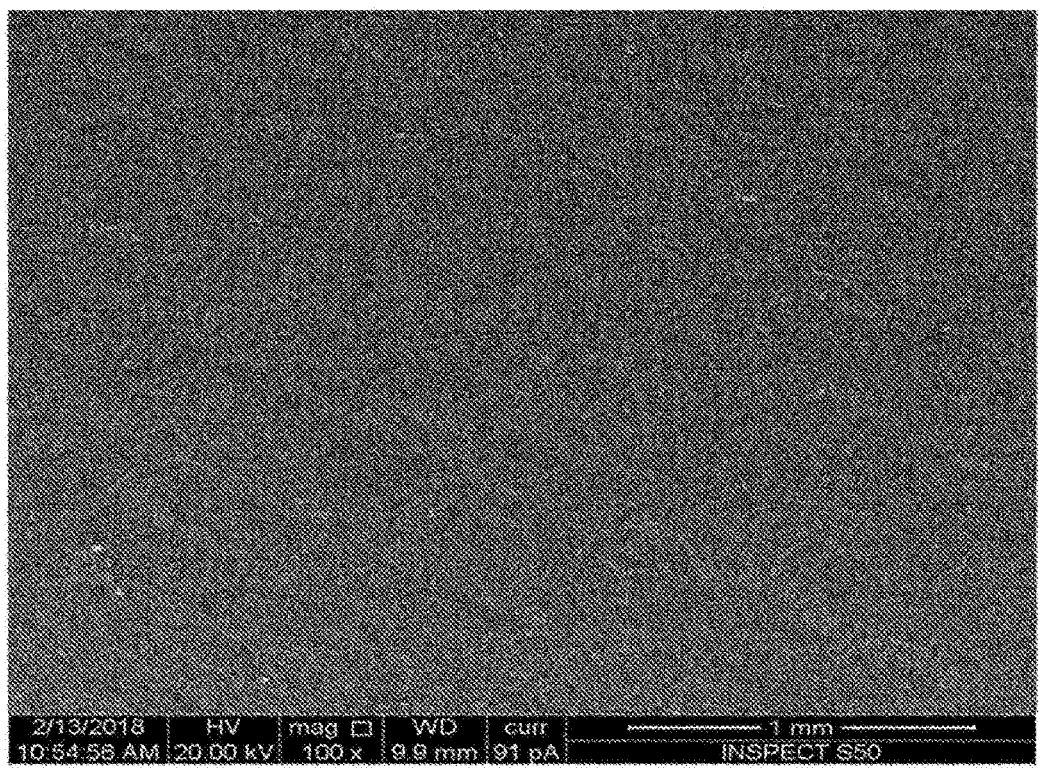
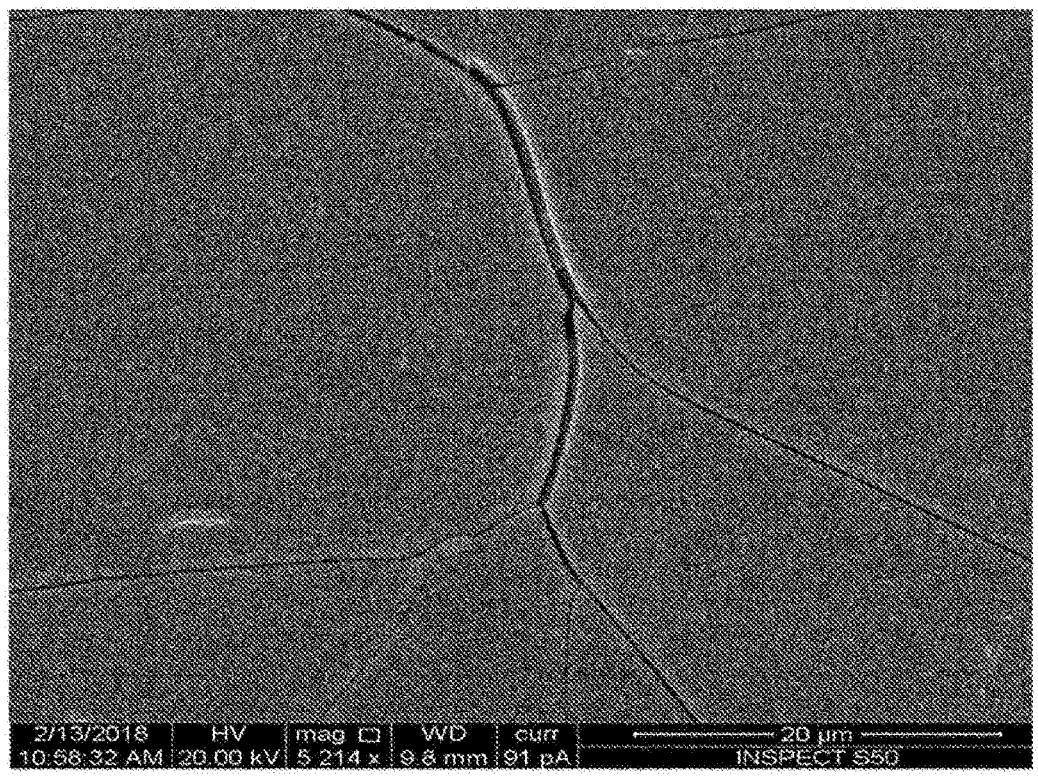

[FIG. 11]
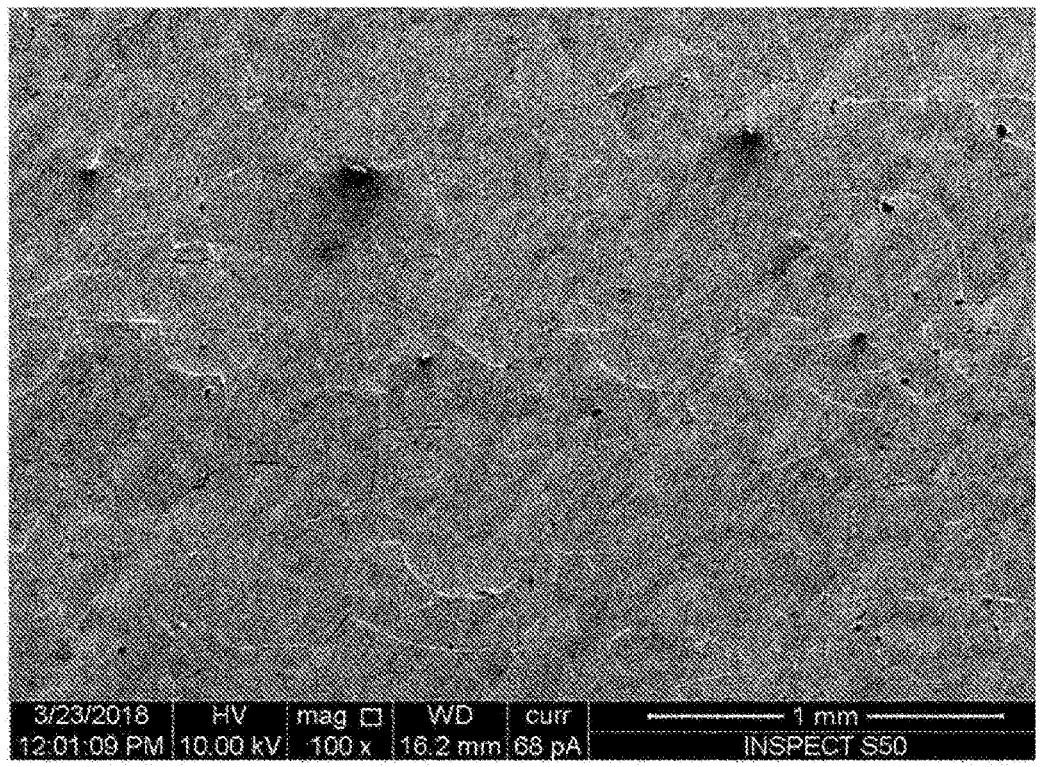
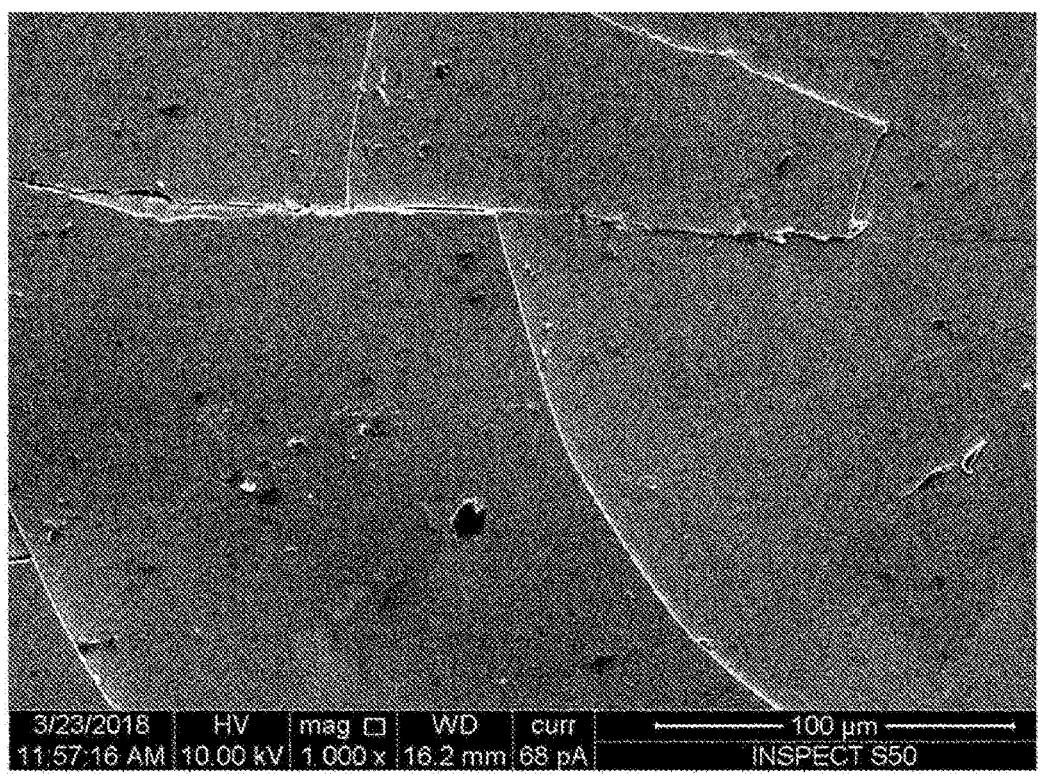

[FIG. 12]
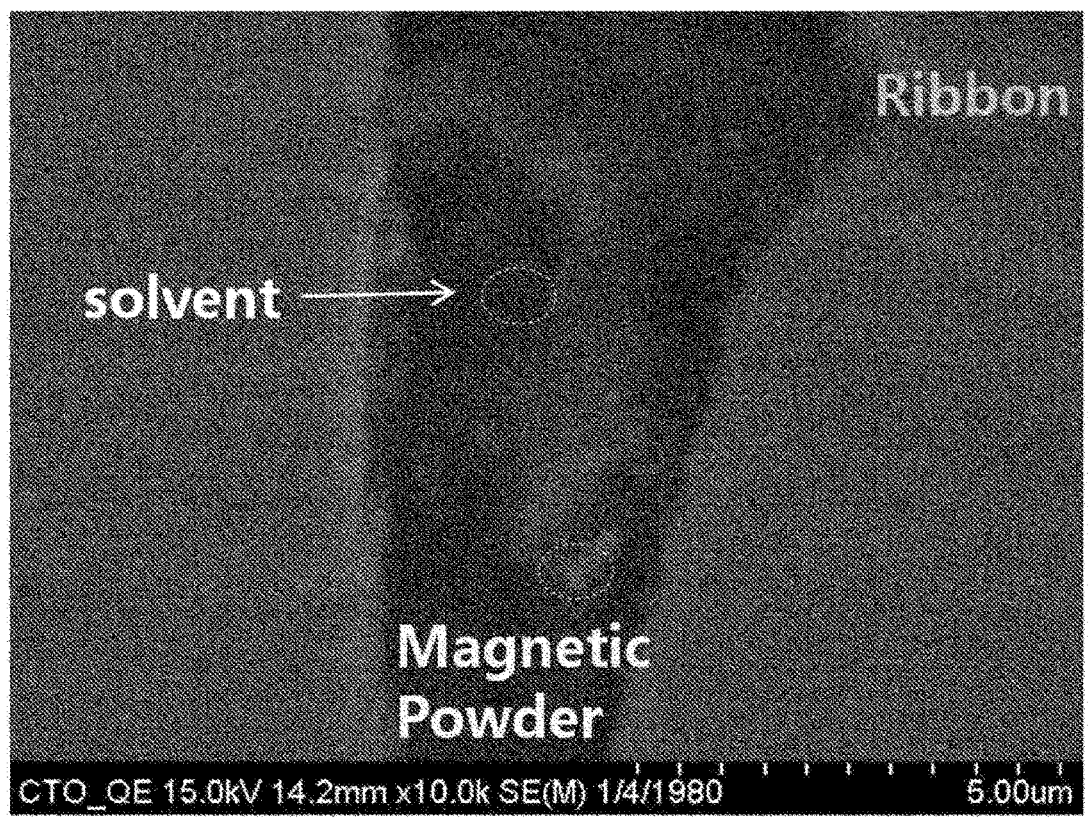

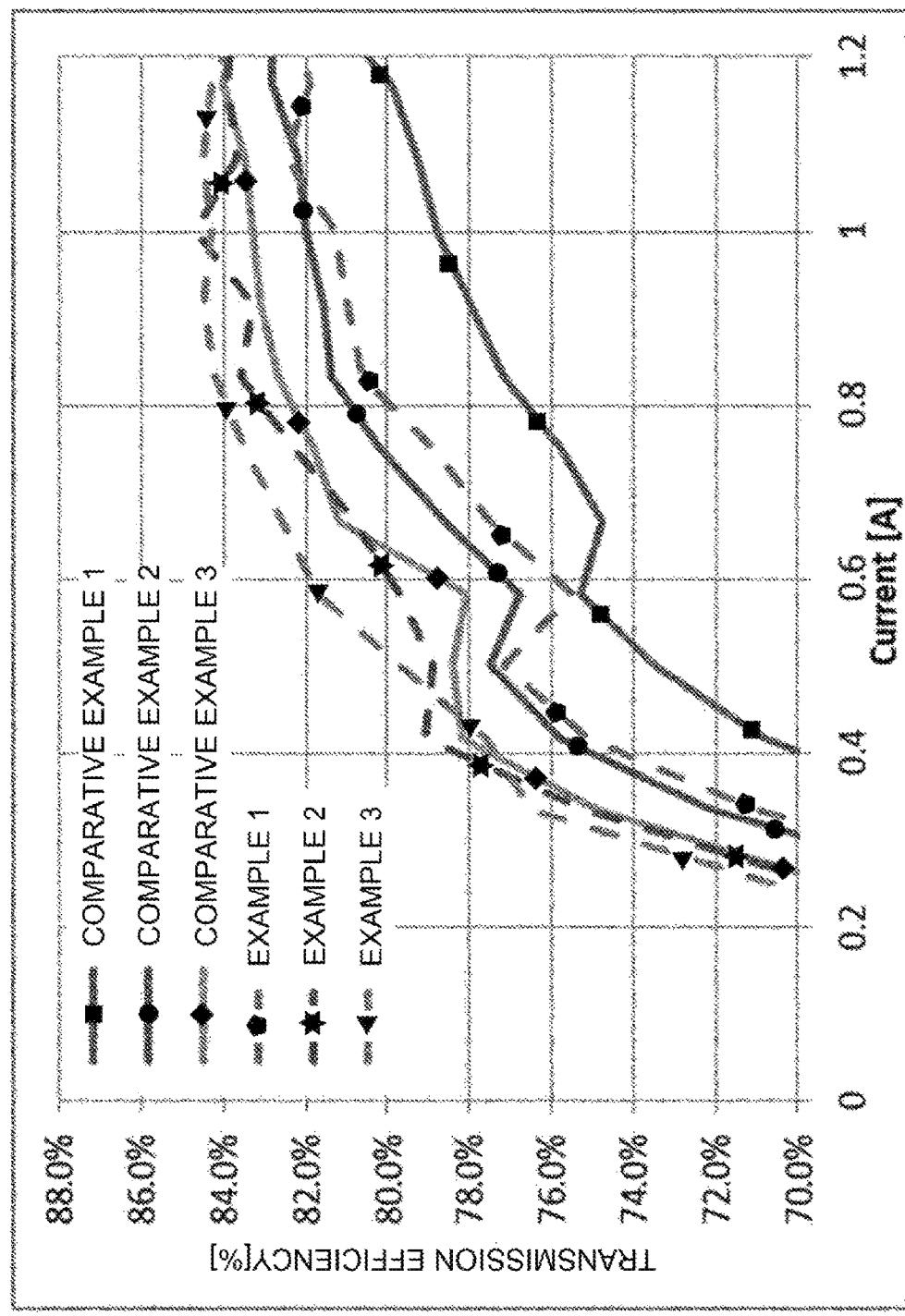
[FIG. 13]

[FIG. 14]
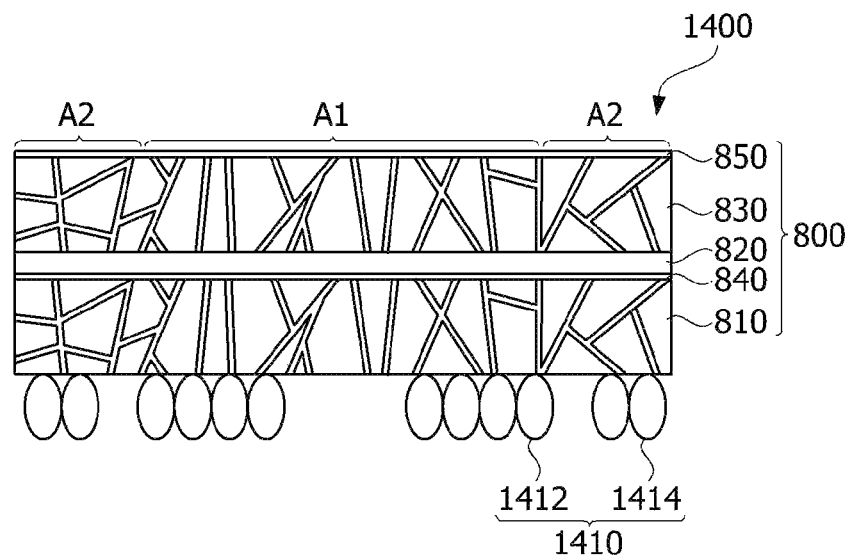
[FIG. 15]
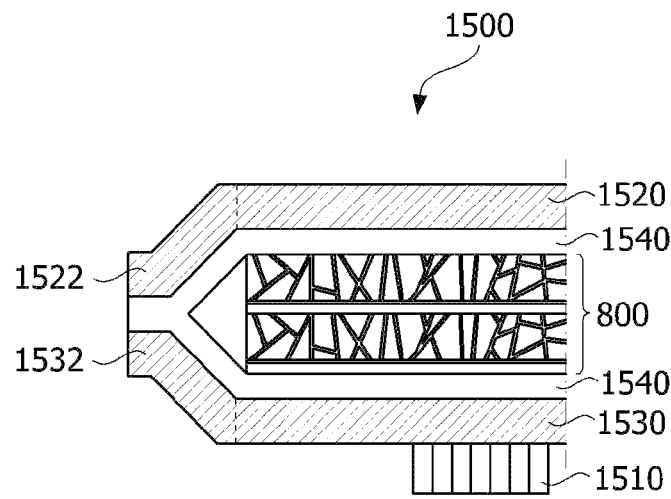

[FIG. 16]
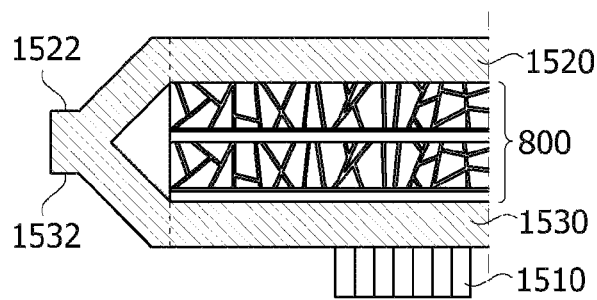
[FIG. 17]
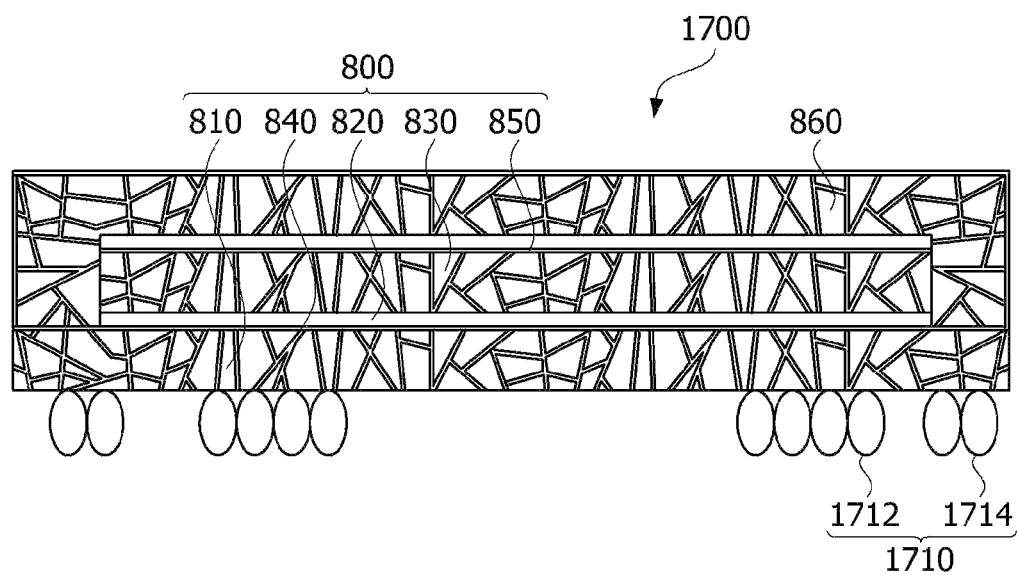

MAGNETIC SHEET AND WIRELESS POWER MODULE COMPRISING SAME

CROSS-REFERENCE TO RELATED PATENT APPLICATIONS

This application is a U.S. National Stage Application under 35 U.S.C. § 371 of PCT Application No. PCT/KR2019/005761, filed May 14, 2019, which claims priority to Korean Patent Application No. 10-2018-0061265, filed May 29, 2018, whose entire disclosures are hereby incorporated by reference.

TECHNICAL FIELD

The present invention relates to a magnetic sheet and a wireless power module including the same, and more specifically, to a crack of a magnetic sheet.

BACKGROUND ART

Wireless power transmission/reception technology is technology which wirelessly supplies power to an electronic device. In order to increase power transmission/reception efficiency, it is necessary to minimize energy loss between a wireless power transmitting device and a wireless power receiving device. To this end, electromagnetic energy radiated by a transmitting antenna can be focused in a direction of a receiving antenna by disposing a magnetic sheet around the transmitting antenna and the receiving antenna.

Meanwhile, a magnetic metal ribbon is used in an inductor or a magnetic core operating in a frequency band of several hundreds of Hz. Such a metal ribbon has a high magnetic flux density, and thus can be applied as a shielding material for wireless charging operating in a frequency band of several hundreds of kHz (for example, a frequency band of 100 to 205 kHz). However, to this end, it is necessary to adjust permeability by forming a crack in the metal ribbon.

FIG. 1 illustrates a general process of forming a crack in a metal ribbon.

Referring to FIG. 1, a metal ribbon 10 passes through a space between a lower roller 12 and an upper roller 14. The lower roller 12 can be a urethane roller which transfers the metal ribbon 10, and the upper roller 14 can be a roller having a predetermined pattern for forming a crack in the metal ribbon 10.

The lower roller 12 and the upper roller 14 rotate at a constant speed while pressurizing the metal ribbon 10 with a predetermined pressure. Accordingly, the crack can be formed in the metal ribbon 10.

However, since a cracking process of forming the crack in the metal ribbon 10 is a process of physically crushing the metal ribbon 10, a gap or boundary can occur in a crack area. Due to this gap or boundary, magnetic flux density can be lowered, and it can be difficult to control permeability.

DISCLOSURE

Technical Problem

The present invention is directed to providing a crack formed in a magnetic sheet.

Technical Solution

A magnetic sheet according to one embodiment of the present invention includes: a first soft magnetic layer including a first surface and a second surface opposite to the first surface; a first resin layer disposed on the first surface of the first soft magnetic layer and having a first viscosity; a second soft magnetic layer disposed on the first resin layer; and a second resin layer disposed between the first soft magnetic layer and the first resin layer and having a second viscosity different from the first viscosity, wherein the second resin layer includes a plurality of magnetic particles, the first soft magnetic layer includes a plurality of crack areas propagating from the first surface toward the second surface, and a part of the second resin layer is disposed in the plurality of crack areas.

The first viscosity may be higher than the second viscosity.

The second viscosity may be 300 cps or less.

A vaporization point of the second resin layer may be 110° C. or more.

The plurality of magnetic particles may include Fe.

The D50 of the plurality of magnetic particles may range from 5 to 60 nm

The plurality of magnetic particles may further include at least one selected from the group consisting of C, O, Al, Si, Ni and Nb.

The first viscosity may be 100,000 cps or more.

The second resin layer may include at least one of an organic solvent including at least one of terpineol, dihydroxy terpineol (DHT), and 1-octanol kerosene, a petroleum solvent, an ether-based solvent, and an ester-based solvent.

The magnetic sheet may further include a first polymer layer disposed on one surface of the first soft magnetic layer and a second polymer layer disposed on one surface of the second soft magnetic layer.

The first polymer layer may include a first extending portion extending more than the first soft magnetic layer.

The second polymer layer may include a second extending portion extending more than the second soft magnetic layer.

The first extending portion and the second extending portion may be connected to each other.

The first soft magnetic layer may be disposed between the first polymer layer and the second polymer layer.

The magnetic sheet may further include the plurality of crack areas formed in the second soft magnetic layer.

The plurality of magnetic particles may be 5 to 60 vol % of a total volume of the second resin layer.

The second resin layer may be further disposed on the second surface of the first soft magnetic layer.

The magnetic sheet may further include a third resin layer disposed on the second soft magnetic layer and having a third viscosity, and a fourth resin layer disposed between the second soft magnetic layer and the third resin layer, having a fourth viscosity different from the third viscosity, and including a plurality of magnetic particles dispersed therein.

The third viscosity may be higher than the fourth viscosity.

The second viscosity may be the same as the fourth viscosity.

A wireless power module according to another embodiment of the present invention includes: a magnetic sheet; and a coil layer disposed on the magnetic sheet, wherein the magnetic sheet includes a first soft magnetic layer including a first surface and a second surface opposite to the first surface, a first resin layer disposed on the first surface of the first soft magnetic layer and having a first viscosity, a second soft magnetic layer disposed on the first resin layer, and a second resin layer disposed between the first soft magnetic layer and the first resin layer and having a second viscosity different from the first viscosity, the second resin layer includes a plurality of magnetic particles, the first soft magnetic layer includes a plurality of crack areas propagating from the first surface toward the second surface, and a part of the second resin layer is disposed in the plurality of crack areas.

Advantageous Effects

According to an embodiment of the present invention, a shielding material which maximizes the inductance of a wireless charging coil and minimizes AC resistance (Rs) or magnetic loss ($\mu''$) can be obtained. Accordingly, a magnetic sheet with high magnetic flux density and predictable magnetic permeability can be obtained, and a magnetic sheet with a simple manufacturing process, and low manufacturing costs while simultaneously satisfying high wireless charging efficiency and a high near field communication (NFC) recognition distance can be obtained.

DESCRIPTION OF DRAWINGS

FIG. 1 illustrates a general process of forming a crack in a metal ribbon.

FIG. 2 is a block diagram illustrating a wireless power transmission/reception system according to one embodiment of the present invention.

FIG. 3 is a view illustrating a part of a wireless power transmitting device.

FIG. 4 is a view illustrating a part of a wireless power receiving device.

FIG. 5 is a cross-sectional view of a wireless power module according to one embodiment of the present invention.

FIG. 6 is a cross-sectional view of a wireless power module according to another embodiment of the present invention.

FIG. 7 is a cross-sectional view of a coil layer included in the wireless power module according to one embodiment of the present invention.

FIG. 8 is a cross-sectional view of a magnetic sheet according to one embodiment of the present invention.

FIG. 9 is a view for describing an effect of magnetic particles dispersed in a solvent according to one embodiment of the present invention.

FIG. 10 illustrates a surface of a metal ribbon according to Comparative Example 1.

FIG. 11 illustrates a surface of a metal ribbon according to Example 1.

FIG. 12 illustrates a cross-section of the metal ribbon according to Example 1.

FIG. 13 illustrates results of measuring transmission efficiency of metal ribbons according to Comparative Example 1, Comparative Example 2, and Comparative Example 3 and Example 1, Example 2, and Example 3.

FIG. 14 is a cross-sectional view of the wireless power module according to one embodiment of the present invention.

FIGS. 15 and 16 illustrate a part of a cross-section of the wireless power module according to another embodiment of the present invention.

FIG. 17 illustrates a cross-section of a wireless power module according to still another embodiment of the present invention.

MODES OF THE INVENTION

Since the present invention may be variously changed and have various embodiments, particular embodiments will be exemplified and described in the drawings. However, it should be understood that the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element may be termed a second element, and similarly, a second element may be termed a first element without departing from the scope of the present invention. The term "and/or" includes any one or any combination among a plurality of associated listed items.

When predetermined components are mentioned as being "linked," or "connected" to other components, the components may be directly linked or connected to other components, but it should be understood that additional components may be present therebetween. On the other hand, when the predetermined components are mentioned as being "directly linked," or "directly connected" to other components, it should be understood that no additional components are present between the above-described components.

Terms used in the present application are used solely to describe the particular embodiments and not to limit the present invention. The singular form is intended to also include the plural form unless the context clearly indicates otherwise. It should be further understood that the terms "include," "including," "provide," "providing," "have," and/or "having" used in the present application specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present application have meanings which are the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined in the present application.

Hereinafter, the embodiments will be described in detail with reference to the accompanying drawing drawings, the same reference numerals are applied to the same or corresponding elements, and redundant description thereof will be omitted.

FIG. 2 is a block diagram illustrating a wireless power transmission/reception system according to one embodiment of the present invention.

Referring to FIG. 2, the wireless power transmission/reception system includes a wireless power transmitting device 100 and a wireless power receiving device 200. The wireless power transmitting device 100 applies electrical energy to a transmitting antenna, and the transmitting antenna converts the electrical energy into electromagnetic energy and radiates the electromagnetic energy to the surroundings. The wireless power receiving device 200 receives the electromagnetic energy radiated from the transmitting antenna using a receiving antenna, and converts the electromagnetic energy into the electrical energy for charging.

Here, the wireless power transmitting device 100 is, for example, a transmitting pad. Further, the wireless power receiving device 200 may be some components of a mobile terminal, a home/personal electronic product, a transportation means, and the like to which wireless power transmission/reception technology is applied. The mobile terminal, the home/personal electronic product, the transportation means, and the like to which the wireless power transmission/reception technology is applied may be set to include only the wireless power receiving device 200 or include both the wireless power transmitting device 100 and the wireless power receiving device 200. The wireless power receiving device 200 may be connected to a battery included in the mobile terminal, the home/personal electronic product, the transportation means, and the like, and power received through the wireless power receiving device 200 may be charged to the battery.

Meanwhile, the wireless power receiving device 200 may be configured to have a module simultaneously having a wireless power conversion (WPC) function and a near field communication (NFC) function. In this case, the wireless power receiving device 200 may perform near field wireless communication with an external device 300 including an NFC module.

FIG. 3 is a view illustrating a part of a wireless power transmitting device, and FIG. 4 is a view illustrating a part of a wireless power receiving device.

Referring to FIG. 3, the wireless power transmitting device 100 may include a transmitting circuit (not shown), a soft magnetic core 110, a transmitting antenna 120, and a permanent magnet 130.

The soft magnetic core 110 may be made of a soft magnetic material having a thickness of several mm. Further, the transmitting antenna 120 may consist of a transmitting coil, and the permanent magnet 130 may be surrounded by the transmitting antenna 120. The permanent magnet 130 may be omitted depending on the specification.

Referring to FIG. 4, the wireless power receiving device 200 includes a receiving circuit (not shown), a magnetic sheet 210, and a receiving coil 220. The magnetic sheet 210 may be formed on a substrate (not shown). The substrate may consist of a plurality of layers of fixing sheets, and may be bonded to the magnetic sheet 210 to fix the magnetic sheet 210.

The magnetic sheet 210 focuses electromagnetic energy radiated from the transmitting antenna 120 of the wireless power transmitting device 100. In this specification, the magnetic sheet 210 may be interchanged with a shielding member, a shielding sheet, a shielding layer, a shielding material, a magnetic member, a magnetic layer, and the like. Alternatively, in the specification, the magnetic sheet 210 may include at least one soft magnetic layer. Here, the soft magnetic layer may be interchanged with a soft magnetic sheet, a soft magnetic ribbon, a magnetic ribbon, a metal ribbon, and the like.

The receiving coil 220 is formed on the magnetic sheet 210. The receiving coil 220 may be wound on the magnetic sheet 210 in a direction parallel to a plane of the magnetic sheet 210. For example, a receiving coil applied to a smartphone may be in a form of a spiral coil having an outer diameter not exceeding 50 mm and an inner diameter of 20 mm or more. The receiving circuit converts electromagnetic energy received through the receiving coil 220 into electrical energy, and charges the converted electrical energy to a battery (not shown).

Although not shown, a heat dissipation layer may be further included between the magnetic sheet 210 and the receiving coil 220. In the specification, the receiving coil 220 may be interchanged with a coil for wireless charging. When the wireless power receiving device 200 simultaneously has a WPC function and an NFC function, an NFC coil 230 may be further laminated on the magnetic sheet 210. The NFC coil 230 may be formed to surround the outside of the receiving coil 220. Although not shown, the magnetic sheet 210 may be disposed in areas corresponding to the receiving coil 220 and the NFC coil 230 so as to perform the WPC function and the NFC function.

Further, the receiving coil 220 and the NFC coil 230 may be electrically connected to each other through a terminal 240.

In the specification, the magnetic sheet and the coil disposed on the magnetic sheet may be referred to as a wireless power module, a wireless charging module, or an antenna module.

FIG. 5 is a cross-sectional view of a wireless power module according to one embodiment of the present invention, FIG. 6 is a cross-sectional view of a wireless power module according to another embodiment of the present invention, and FIG. 7 is a cross-sectional view of a coil layer included in the wireless power module according to one embodiment of the present invention.

Referring to FIG. 5, a wireless power module 500 includes a coil layer 510 and a magnetic sheet 520.

The coil layer 510 includes a wound wireless charging coil 512, and an NFC coil 514 surrounding a side surface of the wireless charging coil 512 and wound on the same plane as the wireless charging coil 512.

Although not shown, a part of the NFC coil 514 may cross the wireless charging coil 512 and may be disposed along a part of an inner side surface of the wireless charging coil 512. The embodiment of the present invention may be applied even when the NFC coil is wound at an inner side of the wireless charging coil. Further, for convenience of explanation, although only the wireless charging coil 512 and the NFC coil 514 are described as examples, the present invention is not limited thereto, and a magnetic secure transmission (MST) coil (not shown) which is different from the wireless charging coil 512 and the NFC coil 514 may be further disposed in addition to the wireless charging coil 512 and the NFC coil 514. The MST coil may surround the side surface of the wireless charging coil 512 between the wireless charging coil 512 and the NFC coil 514, and may be disposed on the same plane as the wireless charging coil 512 and the NFC coil 514, and a part of the MST coil may be disposed at an outer surface of the NFC coil 514.

Further, the magnetic sheet 520 is disposed on the coil layer 510. The magnetic sheet 520 may include a plurality of sequentially laminated soft magnetic layers. In this case, an adhesive film or a resin layer may be disposed between the soft magnetic layers. Here, the soft magnetic layer may be a sendust-based (Fe—Si—Al-based) soft magnetic layer, a ferrite-based soft magnetic layer, or a metal ribbon including Fe. Here, the metal ribbon including Fe may refer to amorphous or nanocrystalline metal or an alloy made of a very thin foil through a technique using an atomizer. A thickness of the metal ribbon may be, for example, 0.01 to 0.04 mm. The metal ribbon may be, for example, an alloy ribbon including at least one of Fe, Co, Ni, and Cu, or a metal ribbon including one of Fe, Co, Ni, and Cu, but is not limited thereto. For example, the metal ribbon including Fe may be a Fe—Si—B-based metal ribbon or a Fe—Si—B—Cu—Nb-based metal ribbon.

Referring to FIG. 6, a resin layer 530 may be further disposed between the coil layer 510 and the magnetic sheet

520. The resin layer 530 may support the coil layer 510 and the magnetic sheet 520, and may electrically separate the coil layer 510 from the magnetic sheet 520. Accordingly, reliability of the wireless power module 500 may be enhanced. When the resin layer 530 has heat dissipation performance, the resin layer 530 may dissipate heat generated from the coil layer 510 to the outside through a side surface of the resin layer 530.

In this case, a width length W1 of the resin layer 530 may be greater than a width length W2 of the magnetic sheet 520. For example, the width length W1 of the resin layer 530 may be 1.1 to 2 times, preferably 1.2 to 1.8 times, and more preferably 1.4 to 1.6 times the width length W2 of the magnetic sheet 520. When the width length W1 of the resin layer 530 and the width length W2 of the magnetic sheet 520 satisfy these numerical ranges, the resin layer 530 may stably and electrically separate the coil layer 510 and the magnetic sheet 520, and the magnetic sheet 520 may shield electromagnetic radiated from the coil layer 510, and may obtain high heat dissipation performance.

Meanwhile, referring to FIG. 7, the coil layer 510 may be disposed as a plurality of layers. For example, the wireless charging coil 512 included in the coil layer 510 may include a first wireless charging coil 702 and a second wireless charging coil 704, and an insulating sheet 720 may be disposed between the first wireless charging coil 702 and the second wireless charging coil 704. A first hole 722 may formed in the insulating sheet 720, and the first wireless charging coil 702 may be connected to the second wireless charging coil 704 through the first hole 722.

In this case, the first wireless charging coil 702 is wound parallel to the insulating sheet 720 on one surface of the insulating sheet 720, and the second wireless charging coil 704 may be wound parallel to the insulating sheet 720 on the other surface of the insulating sheet 720. Here, the insulating sheet 720 may consist of, for example, a polyimide (PI) material, but is not limited thereto. In this case, as described above, a current direction of the first wireless charging coil 702 and a current direction of the second wireless charging coil 704 are opposite to each other. Accordingly, since inductance is canceled, mutual inductance of the wireless charging coil 512 may be reduced, and a magnetic inductive coupling coefficient may be increased.

Meanwhile, although not shown, the current direction of the first wireless charging coil 702 and the current direction of the second wireless charging coil 704 may be the same.

Like the above, the NFC coil 514 included in the coil layer 510 may include a first NFC coil 712 and a second NFC coil 714. A second hole 724 is further formed in the insulating sheet 720, and the first NFC coil 712 may be connected to the second NFC coil 714 through the second hole 724.

Like the above, when the coil layer 510 is arranged as a plurality of layers and the coils arranged as the plurality of layers are electrically connected in parallel, the resistance of the coil layer 510 decreases, and accordingly, wireless power transmission/reception efficiency may be enhanced.

Meanwhile, eddy current loss may be reduced and transmission/reception efficiency may be improved by forming cracks in each of a plurality of soft magnetic layers, for example, a plurality of metal ribbons included in the magnetic sheet 520. However, when the cracks are formed in the soft magnetic layer, a gap or boundary may be formed in the soft magnetic layer during a process of forming cracks, and accordingly, there are problems in that the magnetic flux density of the magnetic sheet is reduced and it is difficult to adjust permeability.

Accordingly, in the embodiment of the present invention, the gap or boundary generated by the cracks in the soft magnetic layer are filled with magnetic powder.

FIG. 8 is a cross-sectional view of a magnetic sheet according to one embodiment of the present invention.

Referring to FIG. 8, a magnetic sheet 800 includes a first soft magnetic layer 810, a first resin layer 820 disposed on the first soft magnetic layer 810, and a second soft magnetic layer 830 disposed on the first resin layer 820. Here, the first soft magnetic layer 810 and the second soft magnetic layer 830 may each be a sendust-based (Fe—Si—Al-based) soft magnetic layer, a ferritic soft magnetic layer, or a metal ribbon including Fe, and may each have a thickness of 0.1 mm or less. Here, the metal ribbon including Fe may refer to amorphous or nanocrystalline metal or an alloy made of a very thin foil through a technique using an atomizer. A thickness of the metal ribbon may be, for example, 0.01 to 0.04 mm. The metal ribbon may be, for example, an alloy ribbon including at least one of Fe, Co, Ni, and Cu, or a metal ribbon including one of Fe, Co, Ni, and Cu, but is not limited thereto. For example, the metal ribbon including Fe may be a Fe—Si—B-based metal ribbon or a Fe—Si—B—Cu—Nb-based metal ribbon.

Further, cracks may be formed in at least one of the first soft magnetic layer 810 and the second soft magnetic layer 830. The cracks may be formed in a uniform pattern or may be non-uniformly formed, may be formed by a roller shown in FIG. 1, or may be formed by a punching device having a predetermined shape. For example, the cracks may have a pattern including a plurality of lines, for example, four or more lines radiated from a predetermined point, and a void may be formed in the soft magnetic layer by a gap or boundary generated by cracking, or the gap or boundary itself between fine fragments separated by cracking may be a void. In the specification, the gap or boundary generated by cracking may be referred to as a crack area. Here, a width size d of the gap generated by cracking may be several nm to several μm.

The cracks formed in the first soft magnetic layer 810 and the second soft magnetic layer 830 may be the same or different. For example, at least one of the shape, size, and porosity of the crack formed in the first soft magnetic layer 810 may be the same as or different from at least one of the shape, size, and porosity of the crack formed by the second soft magnetic layer 830.

Here, the first resin layer 820 may perform a function of insulating between the first soft magnetic layer 810 and the second soft magnetic layer 830 to reduce eddy current loss, or a function of adhering the first soft magnetic layer 810 and the second soft magnetic layer 830. In this case, the first resin layer 820 may be at least one of an acrylic resin, a silicone resin, a rubber resin, and an ethylene vinyl acetate (EVA) resin having a viscosity of 100,000 cps or more, preferably 150,000 cps or more, and more preferably 200,000 cps or more.

Meanwhile, the magnetic sheet 800 may further include a second resin layer 840 having a viscosity different from the viscosity of the first resin layer 820 and disposed between the first soft magnetic layer 810 and the first resin layer 820, and a part of the second resin layer 840 may be disposed in a plurality of crack areas formed in the first soft magnetic layer 810. To this end, the viscosity of the second resin layer 840 may be lower than the viscosity of the first resin layer 820, and accordingly, a part of the second resin layer 840 may permeate into the crack area formed in the first soft magnetic layer 810.

Here, the viscosity of the second resin layer 840 may be 300 cps or less. Preferably, the viscosity may be 20 to 150 cps. More preferably, the viscosity may be 30 to 100 cps, and the second resin layer 840 may include a plurality of magnetic particles 844 dispersed in a solvent 842. In this case, the solvent 842 may include one or more of an organic solvent such as terpineol, dihydroxy terpineol (DHT), and 1-octanol kerosene, a petroleum-based solvent, an ether-based solvent, and an ester-based solvent, and the petroleum-based solvent may include kerosene, but the present invention is limited thereto, and a material which does not vaporize at 110° C. or less, which is the maximum heating temperature of the wireless charging operation environment, that is, all materials having a vaporization point of 110° C. or more may be applied. Further, the plurality of magnetic particles 844 may include Fe, and may further include at least one selected from the group consisting of C, O, Al, Si, Ni, and Nb. Specifically, the plurality of magnetic particles 844 may include at least one selected from the group consisting of Fe—Si—Al alloy powder, Fe—Ni alloy powder, Fe—Si alloy powder, Fe—Cu—Si alloy powder, Fe—Si—B alloy powder, Fe—Si—B—Cu—Nb alloy powder, Fe—Si—Cr alloy powder, Fe—Si—Cr—Ni alloy powder, Fe—Si—C—P alloy powder, Fe—Si—Al—Ni—Cr-based alloy powder, ferrite, and cast iron powder. In this case, the D50 of the plurality of magnetic particles 844 may be 100 nm or less, and preferably 5 to 60 nm, and may have a plate shape or spherical shape.

Like the above, when the viscosity is 300 cps or less and the second resin layer 840 including the plurality of magnetic particles dispersed in the solvent is disposed on the first soft magnetic layer 810, the magnetic particles may be effectively filled into the crack area having a width size d of several nm to several μm. When the crack area of the first soft magnetic layer 810 is filled with the magnetic particles, the magnetic flux density may be increased, and accordingly, shielding performance may be improved. Further, the magnetic flux density and the permeability may be adjusted according to the content of the magnetic particles dispersed in the second resin layer 840.

In addition, when the second resin layer 840 including the magnetic particles is disposed on the first soft magnetic layer 810, and the crack area of the first soft magnetic layer 810 is also filled with a part of the second resin layer 840, magnetic characteristics of the first soft magnetic layer 810 may be enhanced, and accordingly, wireless charging efficiency may be increased.

To this end, after the crack area is formed in the first soft magnetic layer 810, the first soft magnetic layer 810 where the crack area is formed may be immersed in a solution forming the second resin layer 840. Accordingly, the second resin layer 840 may permeate into the crack area formed in the first soft magnetic layer 810, and although not shown, the second resin layer 840 may be further disposed on the other side opposite to the surface on which the first resin layer 820 is disposed among both surfaces of the first soft magnetic layer 810. That is, in FIG. 8, it is shown that the second resin layer 840 is disposed only on an upper surface of both surfaces of the first soft magnetic layer 810, but the present invention is not limited thereto, and the second resin layer 840 may be further entirely or partially disposed on the lower surface facing the upper surface of the first soft magnetic layer 810.

Further, after forming the crack area in the first soft magnetic layer 810, the solution forming the second resin layer 840 is directly applied on one surface of the first soft magnetic layer 810 so that the second resin layer 840 may permeate into the crack area formed in the first soft magnetic layer 810. Accordingly, the second resin layer 840 may be disposed on a surface between the first soft magnetic layer 810 and the first resin layer 820 among both surfaces of the first soft magnetic layer 810. In this case, due to fluidity of the solution forming the second resin layer 840, the second resin layer 840 may be further disposed on the surface between the first soft magnetic layer 810 and the first resin layer 820 among both surfaces of the first soft magnetic layer 810, that is, a portion of the other surface facing the surface on which the second resin layer 840 is directly applied.

For more specific description, referring to FIG. 9, general magnetic particles maintain magnetism thereof according to a spin state, and when the magnetic particles 844 are dispersed in the solvent 842, the magnetic particles 844 may easily flow in the solvent 842, and magnetic characteristics may be further increased due to the flow of the particles.

The magnetic particles 844 may be 5 to 60 vol % of a total volume of the second resin layer 840, preferably, may be 10 to 50 vol % of the total volume of the second resin layer 840, and more preferably, may be 15 to 40 vol % of the total volume of the second resin layer 840. When the magnetic particles 844 are less than 5 vol % of the total volume of the second resin layer 840, an additional magnetic characteristic enhancement effect through the magnetic particles 844 may not be expected, and when the magnetic particles 844 exceed 60 vol % of the total volume of the second resin layer 840, each magnetic particle may act as a factor to interfere with each other's flow due to an excessive amount of magnetic particles.

Meanwhile, referring to FIG. 8 again, the second soft magnetic layer 830 may also include magnetic particles dispersed in a solvent thereon, and a third resin layer 850 having a viscosity lower than that of the first resin layer 820, for example, the same components as the second resin layer 840 may be further disposed, a part of the third resin layer 850 may be disposed in the crack area formed in the second soft magnetic layer 830, and although not shown, the third resin layer 850 may be further disposed between the first resin layer 820 and the second soft magnetic layer 830 on the same principle as the above-described embodiment in which the second resin layer 840 is disposed on both surfaces of the first soft magnetic layer 810.

In one embodiment of the present invention, a thickness of the first resin layer 820 may be greater than a thickness of the second resin layer 840. In this case, the thickness of the first resin layer 820 may be 1 to 20 μm, and the thickness of the second resin layer 840 may be 10 nm to 800 nm.

Here, an example in which the magnetic sheet 800 includes two soft magnetic layers, that is, the first soft magnetic layer 810 and the second soft magnetic layer 830, is described but this is for convenience of description, and the present invention is not limited thereto. The magnetic sheet 800 may include one or more soft magnetic layers, for example, two soft magnetic layers, three soft magnetic layers, four soft magnetic layers, or five or more soft magnetic layers. Here, as described above, two resin layers may be disposed between the soft magnetic layers which are vertically laminated. That is, a resin layer such as the first resin layer like the above may be disposed between a lower soft magnetic layer and an upper soft magnetic layer, and a resin layer such as the second resin layer like above may be further disposed between the lower soft magnetic layer and the first resin layer.

Here, the present invention will be more specifically described using Comparative Examples and Examples.

FIG. 10 illustrates a surface of a metal ribbon according to Comparative Example 1, FIG. 11 illustrates a surface of a metal ribbon according to Example 1, and FIG. 12 illustrates a cross-section of the metal ribbon according to Example 1. Further, FIG. 13 and Table 3 illustrate results of measuring transmission efficiency of metal ribbons according to Comparative Example 1, Comparative Example 2, and Comparative Example 3, Example 1, Example 2, and Example 3.

In Comparative Example 1, Comparative Example 2, and Comparative Example 3, Example 1, Example 2, and Example 3, a Fe—Si-based metal ribbon was cracked to a width of 10 nm or more, Comparative Example 1 and Example 1 each included two metal ribbons, Comparative Example 2 and Example 2 each included three metal ribbons, and Comparative Example 3 and Example 3 each included four metal ribbons.

Further, in Example 1, Example 2, and Example 3, after cracking each metal ribbon, the metal ribbon was impregnated in a solvent in which magnetic particles were dispersed. After polishing and semi-drying it, in this case, the magnetic particles included Fe3O4, and the particle size D50 was about 10 nm, and a viscosity of the solvent in which the particles were dispersed was 80 cps.

The characteristics of the metal ribbons included in Comparative Example 1, Comparative Example 2, and Comparative Example 3 and the characteristics of the metal ribbons included in Example 1, Example 2, and Example 3 were measured as shown in the following Table 1.

TABLE 1

| Characteristics | Comparative Examples 1, 2, 3 | Examples 1, 2, 3 |
|---|---|---|
| L[H] | 6.15E−07 | 1.23E−06 |
| Q | 4.8 | 6.8 |
| μ' | 366.9 | 732.3 |

Referring to Table 1, as shown in Examples 1, 2, and 3, when the metal ribbon is impregnated in the solvent in which magnetic particles are dispersed, it can be seen that the magnetic permeability (μ') significantly increases.

Specifically, referring to FIG. 13 and Table 2, when comparing Comparative Example 1 and Example 1, Comparative Example 2 and Example 2, and Comparative Example 3 and Example 3, respectively, it can be seen that transmission efficiency is higher in Example 1, Example 2, and Example 3 than Comparative Example 1, Comparative Example 2, and Comparative Example 3. Specifically, since the transmission efficiency of Example 1 including two metal ribbons is higher than that of Comparative Example 2 including three metal ribbons, according to the embodiment of the present invention, it can be seen that the number of laminations may be reduced and high transmission efficiency may be obtained.

TABLE 2

| Power | Comparative Example 1 | Comparative Example 2 | Comparative Example 3 | Example 1 | Example 2 | Example 3 |
|---|---|---|---|---|---|---|
| 0 | 0.0% | 0.0% | 0.0% | 0.0% | 0.0% | 0.0% |
| 1 | 31.6% | 37.6% | 41.0% | 36.4% | 40.7% | 43.9% |
| 2 | 46.5% | 52.8% | 56.7% | 51.6% | 56.8% | 59.3% |
| 3 | 59.4% | 66.1% | 69.3% | 64.8% | 69.5% | 70.7% |
| 4 | 66.3% | 72.1% | 74.9% | 71.0% | 75.2% | 76.5% |
| 5 | 70.8% | 75.8% | 78.2% | 75.1% | 79.1% | 77.6% |
| 6 | 73.5% | 77.5% | 78.4% | 77.2% | 78.9% | 79.7% |
| 7 | 75.3% | 76.8% | 78.1% | 75.5% | 79.7% | 81.7% |
| 8 | 74.8% | 78.6% | 81.2% | 77.5% | 80.8% | 82.6% |
| 9 | 75.8% | 80.2% | 81.8% | 78.9% | 82.3% | 83.5% |
| 10 | 77.2% | 81.4% | 82.7% | 80.6% | 83.6% | 84.2% |
| 11 | 78.0% | 81.6% | 83.1% | 81.0% | 83.3% | 84.5% |
| 12 | 78.8% | 82.0% | 83.3% | 81.3% | 84.7% | 84.3% |
| 13 | 79.3% | 82.2% | 83.5% | 82.5% | 83.7% | 84.5% |
| 14 | 79.9% | 82.8% | 84.0% | 81.9% | 83.9% | 84.3% |
| 15 | 81.4% | 82.8% | 83.7% | 82.2% | 83.8% | 83.6% |
| Max | 81.4% | 82.8% | 84.0% | 82.5% | 84.7% | 84.5% |

The magnetic sheet according to the embodiment of the present invention may be applied to the wireless power module.

FIG. 14 is a cross-sectional view of the wireless power module according to one embodiment of the present invention.

Referring to FIG. 14, a wireless power module 1400 includes the magnetic sheet 800 according to the embodiment of the present invention and a coil layer 1410 disposed on the magnetic sheet 800.

As described in FIG. 5, the coil layer 1410 may include a wound wireless charging coil 1412, and an NFC coil 1414 surrounding a side surface of the wireless charging coil 1412 and wound on the same plane as the wireless charging coil 1412.

To this end, the magnetic sheet 800 may be classified into a first area A1 corresponding to an area where the wireless charging coil 1412 is disposed and a second area A2 corresponding to an area where the NFC coil 1414 is disposed. Since the permeability suitable for the wireless charging coil 1412 and the permeability suitable for the NFC coil 1414 may be different, permeability of the first area A1 and permeability of the second area A2 may be differently adjusted. For example, at least one of the shape, size, and porosity of the crack formed in the first area A1 may be different from at least one of the shape, size, and porosity of the crack formed in the second area A2. Alternatively, the content of magnetic particles of the resin layer which penetrate into a crack area of the first area A1 may be different from the content of magnetic particles of the resin layer which penetrate into a crack area of the second area A2.

Although not shown, the magnetic sheets 800 may be respectively disposed in an area (for example, A1) corresponding to the area where the wireless charging coil 1412 is disposed and an area (for example, A2) corresponding to the area where the NFC coil 1414 is disposed. In this case, constituent materials of the magnetic sheets 800 disposed in the areas may be different.

Meanwhile, according to the embodiment of the present invention, the magnetic sheets may be surrounded by a polymer layer.

FIGS. 15 and 16 illustrate a part of a cross-section of the wireless power module according to another embodiment of the present invention.

Referring to FIGS. 15 and 16, a wireless power module 1500 includes the magnetic sheet 800 according to one embodiment of the present invention and a coil layer 1510, and the magnetic sheet 800 may be surrounded by a polymer layer.

Specifically, a first polymer layer 1520 may be disposed on one side of the magnetic sheet 800, and a second polymer layer 1530 may be disposed on the other side of the magnetic sheet 800. In this case, the second polymer layer 1530 may be disposed between the magnetic sheet 800 and the coil layer 1510.

The first polymer layer 1520 may include a first extending portion 1522 extending and bent from the magnetic sheet 800, the second polymer layer 1530 may include a second extending portion 1532 extending and bent from the magnetic sheet 800, and the first extending portion 1522 and the second extending portion 1532 may come into contact with each other so as to surround an exposed portion of the magnetic sheet 800. In this case, a distance between the first extending portion 1522 and the second extending portion 1532 may become closer as a distance from the exposed portion of the magnetic sheet 800 increases, and an air layer may be formed between the exposed portion of the magnetic sheet 800, and the first extending portion 1522 and the second extending portion 1532. Here, the exposed portion of the magnetic sheet 800 may be the outermost surface of the magnetic sheet 800. Alternatively, when a processing hole for alignment is formed in the magnetic sheet 800, the exposed portion of the magnetic sheet 800 may be an area exposed by the hole.

A length l of at least one of the first extending portion 1522 and the second extending portion 1532 and a thickness h of the magnetic sheet 800 may be formed to have a relationship of the following Equation 1.

$$l = A \times h \quad \text{[Equation 1]}$$

In this case, A is a constant of 0.6 to 10, and when a value of A is less than 0.6, since the length l of at least one of the first extending portion 1522 and the second extending portion 1532 is not enough to surround the side surface of the magnetic sheet 800, and thus some of the solvent in the magnetic sheet 800 may leak out or debris due to the cracking may leak out to the outside, an adverse electromagnetic effect on the coil layer 1510 may be caused, or external moisture or salt may penetrate into the magnetic sheet 800 to cause corrosion. When the value of A exceeds 10, since the first extending portion 1522 or the second extending portion 1532 excessively extends and thus is easily bent from an external impact and then damage easily occurs, or a separate accommodation part should be added, a problem of an increase in thickness may occur. Here, at least one of the first polymer layer 1520 and the second polymer layer 1530 may include at least one of polyethylene, polyacryl, polyimide, polyamide, and polyurethane. Accordingly, it is possible to protect the magnetic sheet 800 from external foreign matter or moisture.

Meanwhile, as shown in FIG. 15, an adhesion layer 1540 which adheres the magnetic sheet 800 and the first polymer layer 1520 and adheres the magnetic sheet 800 and the second polymer layer 1530 may be further disposed. As shown in FIG. 8, the adhesion layer 1540 may be formed of the same material as the first resin layer 820.

FIG. 17 illustrates a cross-section of a wireless power module according to still another embodiment of the present invention.

Referring to FIG. 17, a wireless power module 1700 may include the magnetic sheet 800 according to the embodiment of the present invention and a coil layer 1710 disposed on the magnetic sheet 800.

Here, the magnetic sheet 800 may include three or more soft magnetic layers, and at least one of the lowermost soft magnetic layer 810 and the uppermost soft magnetic layer 860 may extend more outward than the outermost side of an intermediate soft magnetic layer 830 to be disposed on a side surface of the intermediate soft magnetic layer 830. Accordingly, since magnetic shield treatment is performed on the side surface of the magnetic sheet 800, leakage magnetic flux generated from the side surface of the magnetic sheet 800 may be minimized.

Although the above-described embodiments are mainly described with reference to the embodiments of the present invention, the above is only exemplary, and it should be understood that those skilled in the art may variously perform modifications and applications within the spirit of the embodiments. For example, elements specifically shown in the embodiments may be modified. Further, differences related to modifications and changes should be understood as being included in the scope of the present invention defined in the appended claims.

The invention claimed is:

1. A magnetic sheet comprising:
   a first soft magnetic layer including a first surface and a second surface opposite to the first surface;
   a first resin layer disposed on the first surface of the first soft magnetic layer and having a first viscosity;
   a second soft magnetic layer disposed on the first resin layer; and
   a second resin layer disposed between the first soft magnetic layer and the first resin layer and having a second viscosity different from the first viscosity,
   wherein the second resin layer includes a plurality of magnetic particles,
   the first soft magnetic layer includes a plurality of crack areas propagating from the first surface toward the second surface, and
   a part of the second resin layer is disposed in the plurality of crack areas.

2. The magnetic sheet of claim 1, wherein the first viscosity is higher than the second viscosity.

3. The magnetic sheet of claim 2, wherein:
   the first viscosity is 100,000 cps or more; and
   the second viscosity is 300 cps or less.

4. The magnetic sheet of claim 1, wherein a vaporization point of the second resin layer is 110° C. or more.

5. The magnetic sheet of claim 1, wherein the plurality of magnetic particles include Fe.

6. The magnetic sheet of claim 5, wherein:
   D50 of the plurality of magnetic particles ranges from 5 to 60 nm; and
   the plurality of magnetic particles are 5 to 60 vol % of a total volume of the second resin layer.

7. The magnetic sheet of claim 1, wherein the second resin layer includes at least one of an organic solvent including at least one of terpineol, dihydroxy terpineol (DHT), and 1-octanol kerosene, a petroleum solvent, an ether-based solvent, and an ester-based solvent.

8. The magnetic sheet of claim 1, wherein the second resin layer is further disposed on the second surface of the first soft magnetic layer.

9. The magnetic sheet of claim 1, further comprising: a third resin layer disposed on the second soft magnetic layer and having a third viscosity; and a fourth resin layer disposed between the second soft magnetic layer and the third resin layer, having a fourth viscosity different from the third viscosity, and including a plurality of magnetic particles dispersed therein.

10. The magnetic sheet of claim 6, wherein the plurality of magnetic particles further includes at least one selected from the group consisting of C, O, Al, Si, Ni and Nb.

11. The magnetic sheet of claim 1, further comprising:
a first polymer layer disposed on one surface of the first soft magnetic layer; and
a second polymer layer disposed on one surface of the second soft magnetic layer.

12. The magnetic sheet of claim 11, wherein the first polymer layer includes a first extending portion extending more than the first soft magnetic layer.

13. The magnetic sheet of claim 12, wherein the second polymer layer includes a second extending portion extending more than the second soft magnetic layer.

14. The magnetic sheet of claim 13, wherein the first extending portion and the second extending portion are connected to each other.

15. The magnetic sheet of claim 11, wherein the first soft magnetic layer is disposed between the first polymer layer and the second polymer layer.

16. The magnetic sheet of claim 1, wherein a plurality of crack areas is formed in the second soft magnetic layer.

17. The magnetic sheet of claim 9, wherein the third viscosity is higher than the fourth viscosity.

18. The magnetic sheet of claim 17, wherein the second viscosity is the same as the fourth viscosity.

19. A wireless power module comprising:
a magnetic sheet; and
a coil layer disposed on the magnetic sheet,
wherein the magnetic sheet includes a first soft magnetic layer including a first surface and a second surface opposite to the first surface, a first resin layer disposed on the first surface of the first soft magnetic layer and having a first viscosity, a second soft magnetic layer disposed on the first resin layer, and a second resin layer disposed between the first soft magnetic layer and the first resin layer and having a second viscosity different from the first viscosity,
the second resin layer includes a plurality of magnetic particles,
the first soft magnetic layer includes a plurality of crack areas propagating from the first surface toward the second surface, and
a part of the second resin layer is disposed in the plurality of crack areas.

20. The wireless power module of claim 19, wherein the first viscosity is higher than the second viscosity.

* * * * *